Aug. 4, 1931.   C. E. E. WOLFERMANN   1,816,924
COLLAPSIBLE ROOF BODY FOR AUTOMOBILES
Filed May 12, 1928   2 Sheets-Sheet 1
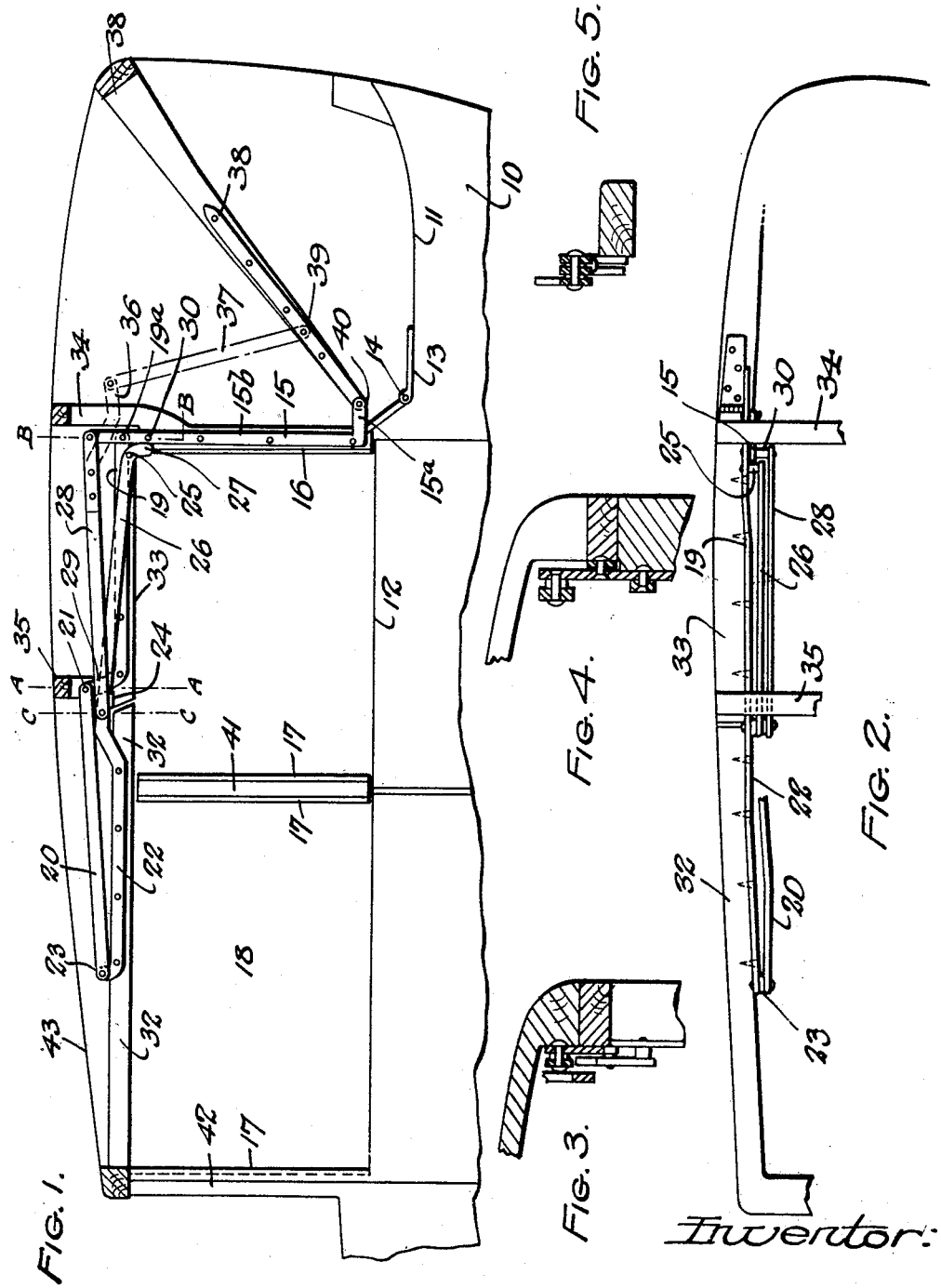
Inventor:
Carl E. E. Wolfermann Aug. 4, 1931.   C. E. E. WOLFERMANN   1,816,924
COLLAPSIBLE ROOF BODY FOR AUTOMOBILES
Filed May 12, 1928   2 Sheets-Sheet 2
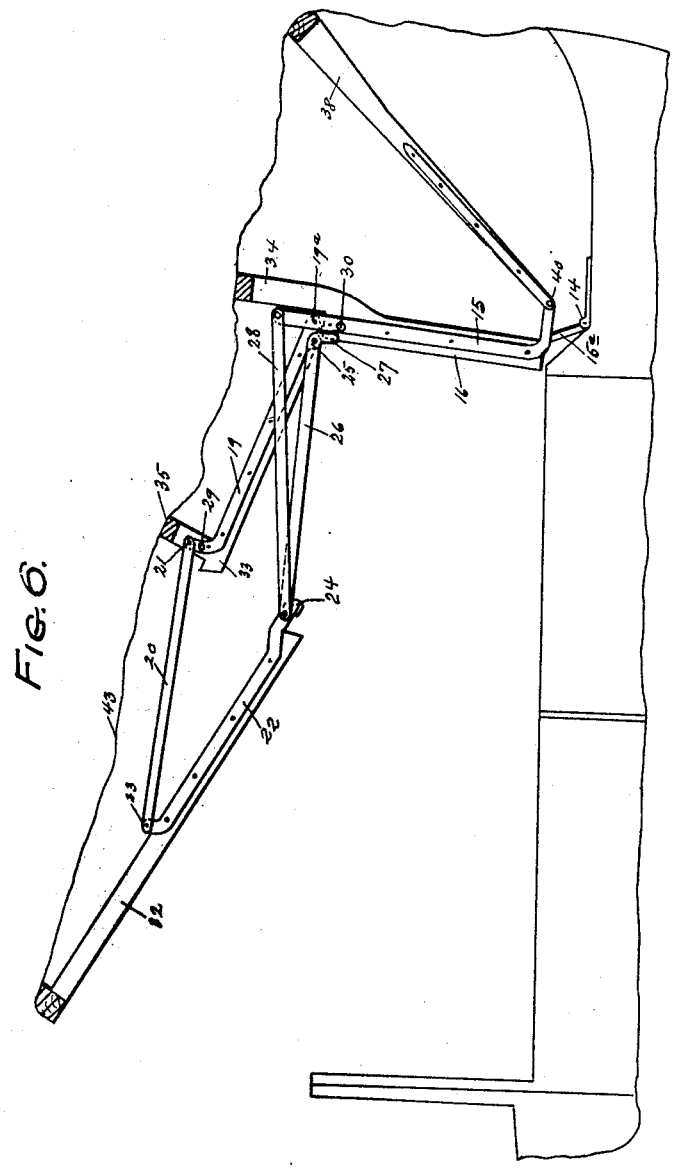
Carl E. Wolfermann
INVENTOR.

Patented Aug. 4, 1931

1,816,924

UNITED STATES PATENT OFFICE

CARL E. E. WOLFERMANN, OF NEW YORK, N. Y.

COLLAPSIBLE ROOF BODY FOR AUTOMOBILES

Application filed May 12, 1928. Serial No. 277,237.

The subject matter of this invention is based on the same principle as that of my copending patent application filed on or about January 28, 1928, #250,178, but contains some material deviations which in their effect bring about a more substantial and stronger construction and at the same time result in an extremely smooth and reliable operation of the roof body. In view of its purposes the roof body consists of the parts described below, the said parts being arranged in relation to each other so as to allow the dropping and raising of the windows of the door and of the sides of the automobile as the weather may make desirable.

Moreover, it is an essential feature of the constructive arrangement of the lowest members of the roof that they extend in one substantially horizontal line and that in this particular position they form such rugged construction that the roof is absolutely prevented from sagging down and that it will be impossible to pull down the roof when in extended position.

It is a further object of the invention to arrange a collapsible roof in such relation to the body of the automobile that the roof in collapsed state does not prevent the passengers on the rear seat from having a full view of the surroundings inasmuch as the body of the car for this purpose is made somewhat lower at its rear end so as to bring the upper rim of the folded body only a litle above the main stream line of the car body.

With these ends in view the invention will be more fully described below and illustrated by the accompanying drawings in which Figure 1 is a side elevation of the collapsible roof body mounted on the right side of the automobile body, the collapsible body being seen from the inside of the automobile. The figure also shows in dashed lines some parts already covered in the senior application, referred to above, which parts may, if desired, be combined with the construction of this present application.

Figure 2 is a fragmentary top view of a horizontal section of the collapsible roof body, the same having been cut along a line substantially parallel to the central longitudinal axis of the automobile.

Figure 3 is a front view of a transverse vertical section on the line A—A of Figure 1.

Figure 4 is a front view of a transverse vertical section along the line B—B of Figure 1.

Figure 5 is the fragmentary view of a vertical section along the line C—C of Figure 1.

Figure 6 is a fragmentary view of a vertical section along a line substantially parallel to the longitudinal axis of the automobile.

Like numerals denote like parts all through the various figures.

In the drawings the numeral 10 denotes the car body proper, the rear part of which has a curved recess 11 disposed somewhat below the stream line 12 of the body 10. In the front corner of the recess 11 a metal plate 13 is rigidly secured by suitable means to the body 10 and is provided with a projection 14 with which a brace 15, of flat iron, or steel, or other suitable metal, bent into a short arm 15a and a long arm 15b, is hingedly connected. If the arm 15b is disposed perpendicularly, the short arm 15a reaches only shortly above the stream line 12. A relatively broad wooden support 16 is secured to the outside of the long arm 15b. This support 16 begins immediately above the stream line 12 and terminates a short distance from the upper end of the arm 15b, its length being approximately identical with the height of the window pane 18. The rail 16 is provided at its front side, adjoining the door, with a suitable guide 17 so as to allow the window pane 18 to slide within the same.

Shortly below the upper end of the arm 15b a support 19 is hingedly connected to the outside of the support 15b, its hinged point 19a being only slightly above the upper rim of the window 18 when the same is closed. The support 19 terminates with its free end in a short arm, bent upwardly at an angle of about 45°. The front end of the upwardly bent arm of the support 19 is hingedly connected with one end of the link 20, a washer 21, of about ¼ to ½ inch thickness, being interposed between the ends of these two braces. The other end of the link 20 is hingedly connected with one end of a support 22, a washer 23, of about ¼ to ½ inch height, being interposed between these two ends. This rail 22 also terminates at its front end in an upwardly bent arm slightly shorter than that of the support 19 and its rear end being also bent at an angle of about 45° which then extends horizontally for a few inches and bends downwardly, terminating in a hook shaped grip 24, open at its top. The support 22 has altogether somewhat the appearance of a downwardly disposed bow. The support 19 has on its lower edge near its hinge point 19a, a lug 25 and a lever 26 having its rear end bent in a downward direction and extending so as to form an arm 27, is hingedly arranged on the inside of that lug 25 at about the bend where the curvature of the depending arm 27 begins. A link 28 is hingedly arranged with its rear end at the upper end on the outside of the arm 15b: both the lever 26 and the link 28 are hingedly connected at their forward ends with the brace 22 at approximately the point where the curvature of the grip 24 starts to go downwardly, the lever 26 being in contact with the brace 22 at its outside and the link 28 on its inside. A washer is interposed between the ends of the link 28 and of the brace iron 15b at their hinge point. A stop 29 is arranged on the inside of the brace 19 slightly below its hinged connection with the link 20 and a stop 30, of a rigid construction, is arranged on the inside of the rail 15b in a distance slightly shorter than the length of the depending arm 27. A wooden rail 32 is riveted in the usual way to the outside of the brace 22 and a wooden rail 33 is arranged on the outside of the brace 19, both rails 33 and 32 abut each other when disposed horizontally below the grip 24. A wooden bow 34 is rigidly secured to the rear side of the wooden support 16 and another wooden bow 35 is mounted on the rail 33 short of its front end.

The link 28 may be extended into a depending bayonet shaped terminal 36, which at its free end is hingedly connected with a link 37 which in turn hingedly engages the rear bow 38 at 39. The rear bow 38 is hingedly connected to the brace 15a on the rear end of the same. The bayonet shaped terminal 36 and the link 37, which are already shown in the senior application, may be omitted from the construction, if desired and they do not necessarily form a part of the present invention.

A pillar 41 is removably secured to the side of the automobile body above the front edge of the door and a stationary pillar 42, supporting the rail 32, is provided at its front end, the pillars 41 and 42 each being provided with guides 17 for conducting the window panes 18 when the same are to be dropped or raised.

A water proof cloth 43 is secured to the front edge of the front bow (not shown) to the outer edges of the rails 32, 33, the bows 35, 34, the rear bow 38 and to the car body 10 along its recess 11.

It will be noticed from an inspection of the drawings that the rails 19, 20, crossing with the rails 22 and 28 are all approximately of the same equal length and that they form a tetrogonal structure which can be knocked down into a flat structure, as is evident by Figure 6. It will furthermore be noticed that the arm 27 which braces the whole flat structure by its contact with stopper 30 will be released from its contact and that the flat structure opens into a tetragonal structure, when it is knocked down; the arm 27 moves then first slightly in a forward direction, but soon afterward moves perpendicularly upwardly whereby it gets clear off said stopper 30 so that the roof body may be dropped upon the rear 11 of the car body.

What I claim is:

In a collapsible roof for automobiles and similar vehicles the combination with a car body, having a downwardly extending recess at its rear end, comprising a double bent perpendicularly disposed brace, having its short arm extend rearwardly, a rear bow hingedly secured to the end of the aforesaid short arm, a horizontally disposed brace hingedly connected with the aforesaid double bent brace at its outside and shortly below its upper end, having a depending lug near its hinge point and projecting upwardly at its front end, a horizontally disposed brace, having its front end project upwardly and its rear end terminating in an upwardly opening grip, a link connecting the front ends of both aforesaid horizontally disposed braces, a link hingedly connecting the bayonet shaped rear end of one of aforesaid horizontally disposed braces and the upper end of aforesaid perpendicularly disposed brace at the inside of both parts, a lever terminating at its rear end into a depending arm, hingedly connected to the outside of the end of the one and to the inside of the lug of the other horizontally disposed brace, a stop rigidly secured on the inside of the perpendicularly disposed brace and abutting the end of the depending arm of the aforesaid lever.

CARL E. E. WOLFERMANN.